H. BEWLAY.
ELECTRICAL SIGNALING SYSTEM.
APPLICATION FILED JULY 2, 1912.

1,081,572.                                          Patented Dec. 16, 1913.

Witnesses:
R.O. Hinkle.
W. F. Hoffman.

Inventor:
Henry Bewlay.
by John E. Roberts
Atty.

UNITED STATES PATENT OFFICE.

HENRY BEWLAY, OF NEWARK, NEW JERSEY, ASSIGNOR TO WESTERN ELECTRIC COMPANY, OF NEW YORK, N. Y., A CORPORATION OF ILLINOIS.

ELECTRICAL SIGNALING SYSTEM.

1,081,572.

Specification of Letters Patent.   Patented Dec. 16, 1913.

Application filed July 2, 1912. Serial No. 707,155.

*To all whom it may concern:*

Be it known that I, HENRY BEWLAY, citizen of the United States, residing at Newark, in the county of Essex and State of New Jersey, have invented a certain new and useful Improvement in Electrical Signaling Systems, of which the following is a full, clear, concise, and exact description.

This invention relates to improvements in electrical signaling systems and more particularly to systems wherein an alternating current is superimposed upon a direct current for the operation of selective signaling apparatus.

This invention is particularly adapted for party line telephone systems employing biased ringers, but it may be advantageously used in other systems wherein it is necessary or advisable to employ a continuously varying current which, however, is distinguished from an ordinary alternating current in that the two parts of an alternating wave length have a different maximum electro-motive force or in that the electro-motive force does not change sign. Heretofore it has been the practice to obtain current of this character by means of batteries and an alternating current generator. The generator or generators have been connected in series with a battery or batteries of suitable voltage and capacity, to form essentially a three conductor system, the polarity of the principal half wave being determined by the pole of the battery which is connected to the line of a station to be signaled. By this invention the necessity of employing batteries for obtaining current of this character is obviated.

This invention will be fully understood from the following description of certain embodiments thereof, and from the accompanying drawings in which—

Figure 1:
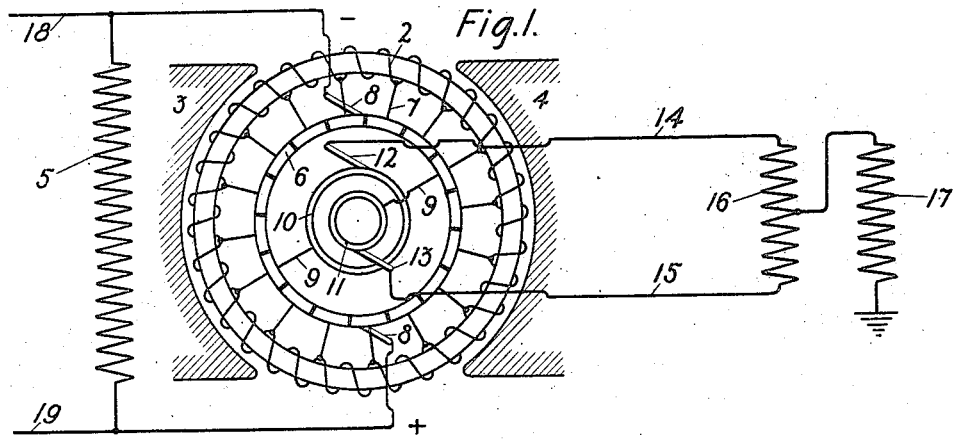
Figure 2:
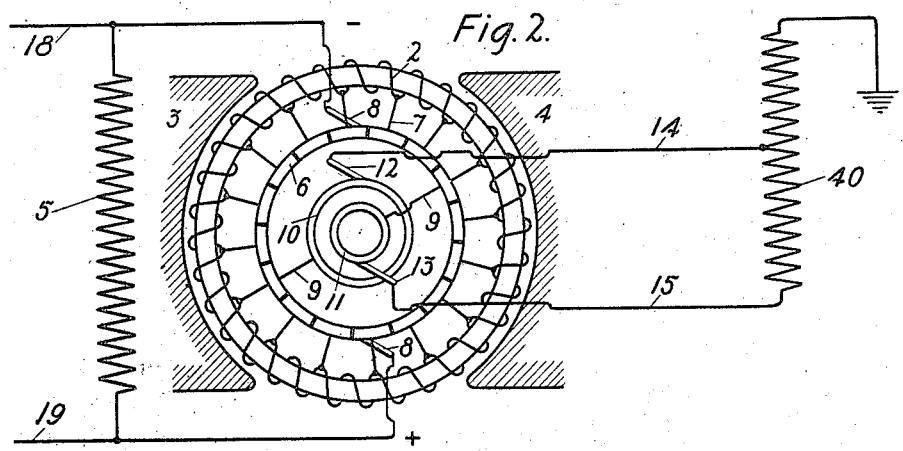
Figure 3:
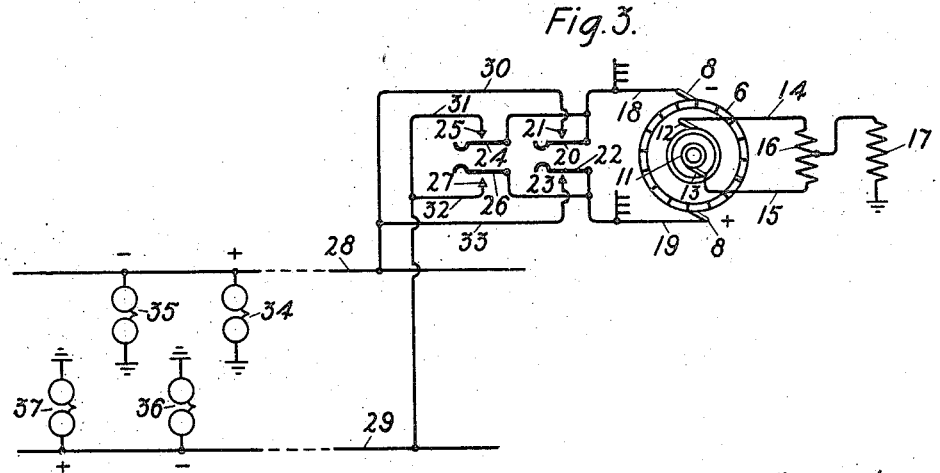

Figure 1 shows diagrammatically the windings of the generator and the transformer and the preferred method of connecting the same. Fig. 2 shows a similar arrangement employing a single coil transformer. Fig. 3 is a diagram of the preferred method of connecting the load to the distributing lines.

Referring to the drawings, 2 represents the generator armature consisting of the usual winding and iron core moving between the magnetic poles 3 and 4. For the purpose of explanation, a bi-polar machine is shown but it is to be understood that a multipolar generator may be employed without any change in the novel features of this invention. In the preferred form of this invention the magnets are energized by a shunt field 5 but any of the other well known methods of exciting the fields of dynamo electric machines may be employed. The winding 2 is connected at intervals to the commutator bars 6 by means of suitable conductors 7, and direct current is taken from the commutator by the brushes 8. At electrically opposite points of the winding 2 the conductors 9 connect the winding to suitable slip rings 10 and 11, and by means of the brushes 12 and 13 bearing upon the slip rings the alternating current generated in the winding 2, is led to the conductors 14 and 15 which are connected to the terminals of the primary winding 16 of a suitable transformer, the secondary 17 of which is in electrical connection with the primary. In the preferred embodiment of this invention, the terminal of the secondary at the opposite end of the winding from that connected to the center of the primary is grounded. The distributing feeders 18 and 19 connected to the brushes 8 receive current of opposite polarity from the commutator bars 6 and convey it to suitable keys or contact switches 20—21, 22—23, 24—25, and 26—27. The keys are suitably connected to the distributing lines 28 and 29 by means of the conductors 30, 31 32 and 33. The signals or ringers 34, 35, 36 and 37 are bridged between the distributing lines 28 and 29 and ground and are biased by any of the well known methods so that the two signals connected to each line are operable by currents, the maximum voltages of which are of opposite polarity.

If it is desired to operate the signal 34, key contacts 22—23 are closed, connecting the positive brush 8 to the line 28. The current then flows through the positive brush, main 19, contacts 22—23, conductor 33, line 28, signal 34, to ground; and from ground through the secondary of the transformer winding 17, through the two halves of the primary 16, conductors 14 and 15, brushes 12 and 13, slip rings 10 and 11, and conductors 9 to the winding 2. It is obvious that upon the positive direct current from the positive brush 8 is superimposed the alternating current from the transformer, and that the signal 34 being biased to operate on positive currents only responds upon the closing of the contacts 22 and 23. In like manner signals 35, 36 and 37 respond upon the closing of the contacts 20—21, 24—25 and 26—27 respectively.

In case it is desired to employ the method of connections shown in Fig. 2 the generator may be wound as before and the windings connected to suitable commutator bars and slip rings. The leads 14 and 15 are however tapped into the winding 40 of a suitably wound single coil or auto transformer 40, one terminal of which is grounded. The voltage of the alternating current superimposed upon the direct current delivered by the brushes 8 may be adjusted by selecting the location of the tap leading to ground. The mains are connected to the distributing lines as before described.

What I claim is:

1. In an electrical signaling system, a common source of direct and alternating currents, distributing lines conductively connected to said common source, and a transformer conductively and inductively connected to said distributing lines and common source.

2. In an electrical signaling system, a common source of direct and alternating currents, distributing lines conductively connected to said common source, and a transformer comprising a primary and secondary, the primary being conductively connected to said common source and the secondary thereof inductively and conductively connected to said primary.

3. In a three conductor electrical signaling system, the combination of two distributing mains, a common source of direct and alternating currents connected thereto, a third conductor, and a transformer conductively and inductively connected to said common source and the third conductor.

4. In an electrical signaling system, the combination of three conducting mains, a common source of direct and alternating currents connected to two of said mains, and a transformer the windings thereof being conductively and inductively connected together and the primary thereof being connected to the common source and the secondary to said third conductor.

5. In an electrical signaling system, the combination of a common source of direct and alternating currents comprising a dynamo electric machine equipped with a commutator and slip rings; three conducting mains two of which are connected to the commutator; and a transformer comprising a primary winding connected to said slip rings, and a secondary winding conductively connected to said primary and the third conductor.

6. In combination a dynamo electric machine equipped with a commutator and slip rings, and a transformer having its primary connected to said slip rings and its secondary in electrical connection with the primary.

In witness whereof, I hereunto subscribe my name this 1st day of July A. D., 1912.

HENRY BEWLAY.

Witnesses:
WALTER F. HOFFMAN,
R. O. HINKLE.

---

Copies of this patent may be obtained for five cents each, by addressing the "Commissioner of Patents, Washington, D. C."